United States Patent
Syed et al.

(10) Patent No.: US 9,591,553 B1
(45) Date of Patent: Mar. 7, 2017

(54) CONTENT ACCESS BASED ON MOBILE DEVICE GEOGRAPHICAL LOCATION

(71) Applicant: EMC Corporation, Hopkinton, MA (US)

(72) Inventors: Ashraf Ali Syed, Bangalore (IN); Raman Walia, Bangalore (IN); Prasad Kumar Thotakura, Bangalore (IN); Vasanth Kumar Somasundaram, Bangalore (IN); Swathi Natarajan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/312,909

(22) Filed: Jun. 24, 2014

(51) Int. Cl.
*H04W 24/00* (2009.01)
*H04W 48/04* (2009.01)
*H04W 4/02* (2009.01)

(52) U.S. Cl.
CPC ........... *H04W 48/04* (2013.01); *H04W 4/023* (2013.01)

(58) Field of Classification Search
CPC ... H04W 24/02; H04W 36/30; H04W 84/045; H04W 36/0083; H04W 36/04; H04W 16/32
USPC .......................................... 455/456.2, 456.1
See application file for complete search history.

(56) References Cited

U.S. PATENT DOCUMENTS

| | | | |
|---|---|---|---|
| 6,041,235 A * | 3/2000 | Aalto | 455/437 |
| 7,882,201 B2 | 2/2011 | Frazier et al. | |
| 2003/0109254 A1* | 6/2003 | Motegi et al. | 455/435 |
| 2011/0137881 A1* | 6/2011 | Cheng et al. | 707/706 |
| 2011/0237286 A1* | 9/2011 | Hosono | 455/515 |
| 2011/0269467 A1* | 11/2011 | Leclerc et al. | 455/436 |
| 2012/0046030 A1* | 2/2012 | Siomina et al. | 455/423 |
| 2012/0052880 A1* | 3/2012 | Hymel et al. | 455/456.3 |

* cited by examiner

*Primary Examiner* — Martin Mushambo
(74) *Attorney, Agent, or Firm* — Dergosits & Noah LLP; Todd A. Noah

(57) ABSTRACT

Content access based on mobile device geographical location is described. A system receives, from a mobile device, a request to access content which is created independently of any geographical location. The system determines if the mobile device provides a corresponding geographical location that is within a specified distance of a specified geographical location. The system enables access, for the mobile device, to the content in response to a determination that the mobile device provides the corresponding geographical location that is within the specified distance of the specified geographical location.

20 Claims, 3 Drawing Sheets

CONTENT ACCESS BASED ON MOBILE DEVICE GEOGRAPHICAL LOCATION

BACKGROUND

With the increasing usage of mobile devices, mobile offices are becoming ubiquitous as workers are accessing work documents and data on their mobile devices at any time and at any place in order to become more proficient and productive.

DETAILED DESCRIPTION

A corporation or an enterprise may desire for protected content to be accessible only from the corporation's or the enterprise's geographical location in order to protect sensitive information. For example, a manufacturing company would like to limit its engineers to access to its design blueprints when the engineers are located on the company premises. In the prior art there is no way to prevent content from being accessed from off-site locations while applying the usual access control policies.

Embodiments herein provide content access based on geographical location. A request is received from a mobile device to access content which is created independently of any geographical location. A determination is made whether the mobile device provides a corresponding geographical location that is within a specified distance of a specified geographical location, which can colloquially be referred to as a "specified geographical fence." Access is enabled for the mobile device to the content if the mobile device provides a corresponding geographical location that is within the specified distance of the specified geographical location. For example, an access application receives a request to access a manufacturing company's design blueprints from a laptop computer used by one of the manufacturing company's engineers. The access application determines if the laptop computer identifies its geographical location as within 500 feet of the center of the manufacturing company's headquarters. The access application sends the requested design blueprints to the laptop computer because the access application has determined that the engineer's laptop computer is within 500 feet of the center of the manufacturing company's headquarters. The access application provides a new level of security and compliance for content to be accessed only from specified geographic locations.

Figure 1:
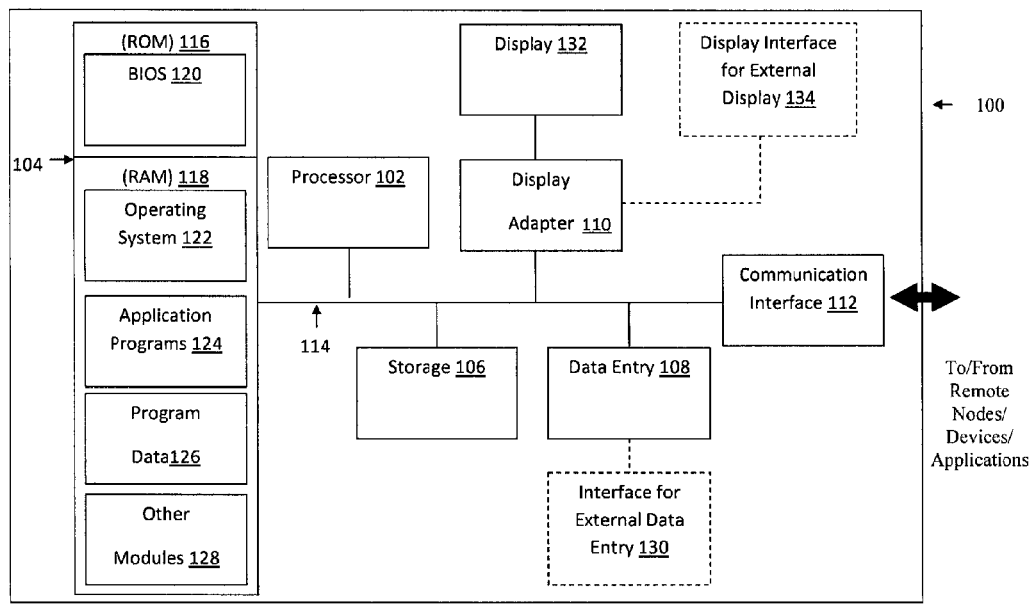
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for content access based on mobile device geographical location.

In the prior art, there is no way to prevent content from being accessed from off-site locations while applying the usual access control policies. Embodiments herein provide content access based on mobile device geographical location. An access application provides a new level of security and compliance for content to be accessed only from specified geographical locations.

Figure 2:
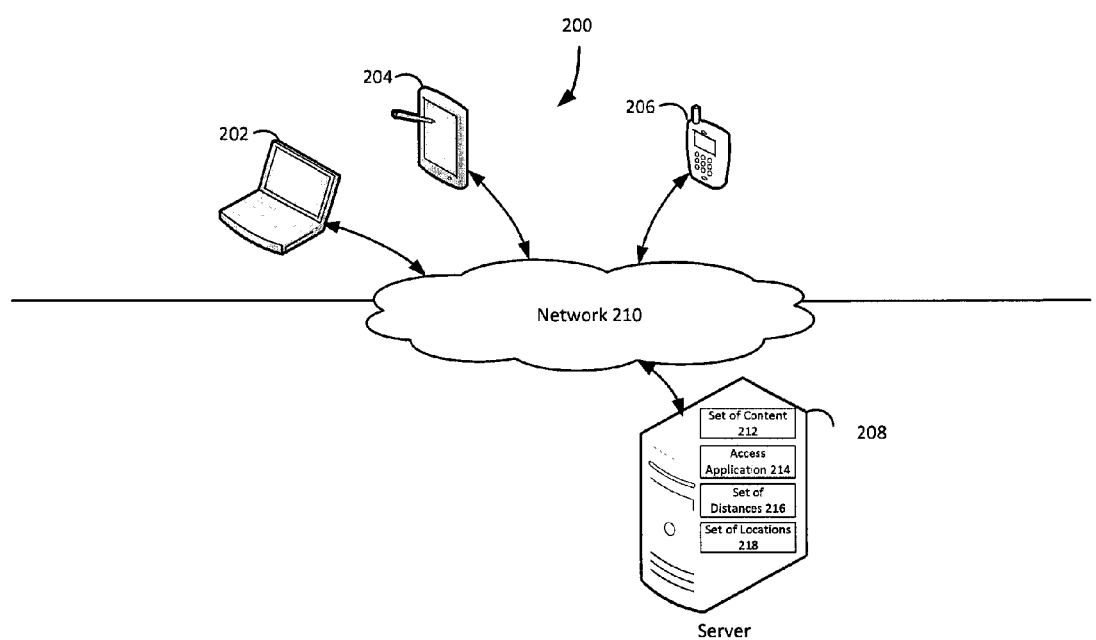
FIG. 2 illustrates a block diagram of an example system for content access based on mobile device geographical location, under an embodiment.

FIG. 2 illustrates a block diagram of a system that implements content access based on mobile device geographical location, under an embodiment. As shown in FIG.

2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a server 208 that may be provided by a hosting company. The first client 202 may be a laptop computer, the second client 204 may be a tablet, and a third client 206 may be a mobile telephone such as a smart phone. The clients 202-206 and the server 208 communicate via a network 210. The server 208 includes a set of content 212, an access application 214, a set of distances 216, and a set of locations 218. Although FIG. 2 depicts the system 200 with three clients 202-206, one server 208, one network 210, one set of content 212, one access application 214, one set of distances 216, and one set of locations 218, the system 200 may include any number of clients 202-206, any number of servers 208, any number of networks 210, any number of sets of content 212, any number of access applications 214, any number of sets of distances 216, and any number of sets of locations 218. The clients 202-206 and the server 208 may each be substantially similar to the system 100 depicted in FIG. 1. FIG. 2 depicts the set of content 212, the access application 214, the set of distances 216, and the set of locations 218 residing completely on the server 208, but the set of content 212, the access application 214, the set of distances 216, and the set of locations 218 may reside completely on any of the clients 202-206, completely on another server that is not depicted in FIG. 2, or in any combination of partially on the server 208, partially on the clients 202-206, and partially on the other server.

The access application 214 receives a request, from a mobile device, to access content which is created independently of any geographical location. For example, the access application 214 receives a request to download from the set of content 212, which includes the manufacturing company's design blueprints 212, to the laptop computer 202, the tablet 204 or the mobile telephone 206 used by one of the manufacturing company's engineers. The content being created independently of any geographical location means that the content is not associated with any geographical location when the content is created. For example, when a manufacturing company engineer creates the manufacturing company's design blueprints 212 using the laptop computer 202, the metadata associated with the manufacturing company's design blueprints 212 may indicate creation by the manufacturing company engineer using the laptop computer 202, but the metadata associated with the manufacturing company's design blueprints 212 does not specify the geographic location of the laptop computer 202 when creating the manufacturing company's design blueprints 212. In the examples discussed below, the access application 214 receives a request from the laptop computer 202. However, the request can also be received from the tablet 204 or the mobile telephone 206.

The access application 214 determines whether a mobile device provides a corresponding geographical location that is within a specified distance of a specified geographical location. For example, the access application 214 determines if the laptop computer 202 identifies its geographical location as within 500 feet of the center of the manufacturing company's headquarters or within 200 feet of the center of the manufacturing company's branch office. A system administrator may specify the set of distances 216, such as 500 feet and 200 feet, and the set of locations 218, such as the center of the manufacturing company's headquarters and the center of the manufacturing company's branch office.

The access application 214 enables access, for a mobile device, to content if the mobile device provides a corresponding geographical location that is within a specified distance of a specified geographical location. For example, the access application 214 enables the downloading of the requested design blueprints 212 to the laptop computer 202 because the access application 214 has determined that the engineer's laptop computer 202 is within 500 feet of the center of the manufacturing company's headquarters. The access to the set of content 212 may be based on a policy that specifies a number of accesses, a time duration for potential accesses, and/or a type of access. For example, when the access application 214 determines that the engineer's laptop computer 202 is within 500 feet of the center of the manufacturing company's headquarters, the access application 214 checks an access policy which specifies that the specific engineer has the specific permission download and read the design blueprints 212 via the laptop computer 202 when the engineer's laptop computer 202 is within 500 feet of the center of the manufacturing company's headquarters, but the engineer is limited to only reading the design blueprints 212 via the laptop computer 202 when the engineer's laptop computer 202 is within 200 feet of the center of the manufacturing company's branch office. In another example, the specific engineer has the specific permission to download the design blueprints 212 to the laptop computer 202 only once within the first week that the design blueprints 212 are created, but has the specific permission to read the design blueprints 212 via the laptop computer 202 on an unlimited number of occasions.

If the access application 214 determines that a mobile device does not provide a corresponding geographical location that is within a specified distance of a specified geographical location, the access application 214 may determine if the mobile device provides any corresponding geographical location. If the access application 214 determines that a mobile device does not provide any corresponding geographical location, the access application 214 requests the mobile device to provide the corresponding geographical location. For example, if the engineer has disabled the geo-location feature of the laptop computer 202, the access application 214 responds to the request to download the design blueprints 212 by prompting the engineer to enable the geo-location feature of the laptop computer 202 and to resubmit the request. If a mobile device provides a corresponding geographical location, but the corresponding geographical location is not within a specified distance of any specified geographical location, the access application 214 disables access, for the mobile device, to the set of the content 212. For example, if the laptop computer 202 is at a hotel, the access application 214 does not enable the design blue print 212 to be downloaded to the laptop computer 202, and sends a request denied/access disabled message to the laptop computer 202.

If the access application 214 enables a mobile device to download content, the access application 214 may embed an offline access control key in the downloaded content to provide off-line access control for the content. For example, the access application 214 enables the downloading of the requested design blueprints 212 to the laptop computer 202, wherein the downloaded design blueprints 212 includes an offline access control key.

An offline access control key created by the access application 214 receives a request, from a mobile device, to access content on the mobile device. For example, the offline access control key created by the access application 214 receives a request to read the copy of the manufacturing company's design blueprints 212 which is stored to the laptop computer 202 used by one of the manufacturing company's engineers.

An offline access control key created by the access application 214 determines whether a mobile device provides a corresponding geographical location that is within a specified distance of a specified geographical location. For example, the offline access control key created by the access application 214 determines if the laptop computer 202 identifies its geographical location as within 500 feet of the center of the manufacturing company's headquarters, within 200 feet of the center of the manufacturing company's branch office, or within 100 feet of the center of the engineer's home residence. A system administrator may specify the set of distances 216, such as 500 feet, 200 feet, and 100 feet, and the set of locations 218, such as the center of the manufacturing company's headquarters, the center of the manufacturing company's branch office, and the center of the engineer's home residence.

An offline access control key created by the access application 214 enables access, for a mobile device, to content stored on the mobile device if the mobile device provides a corresponding geographical location that is within a specified distance of a specified geographical location. For example, the offline access control key created by the access application 214 enables the reading of the requested design blueprints 212 via the laptop computer 202 because the access application 214 has determined that the engineer's laptop computer 202 is within 100 feet of the center of the engineer's home residence. The access to the set of content 212 may be based on a policy that specifies a number of accesses, a time duration for potential accesses, and/or a type of access. For example, when the offline access control key created by the access application 214 determines that the engineer's laptop computer 202 is within 100 feet of the center of the engineer's home residence, the offline access control key created by the access application 214 checks an access policy which specifies that the specific engineer has the specific permission to read the design blueprints 212 via the laptop computer 202 when the engineer's laptop computer 202 is within 100 feet of the center of the engineer's home residence, but the specific engineer does not have the specific permission to download or edit the design blueprints 212 via the laptop computer 202 when the engineer's laptop computer 202 is within 100 feet of the center of the engineer's home residence.

If an offline access control key created by the access application 214 determines that a mobile device does not provide a corresponding geographical location that is within a specified distance of a specified geographical location, the offline access control key created by the access application 214 determines if the mobile device provides any corresponding geographical location. If the offline access control key created by the access application 214 determines that a mobile device does not provide any corresponding geographical location, the offline access control key created by the access application 214 requests the mobile device to provide the corresponding geographical location. For example, if the engineer has disabled the geo-location feature of the laptop computer 202, the offline access control key created by the access application 214 responds to the request to read the copy of the design blueprints 212 stored on the laptop computer 202 by prompting the engineer to enable the geo-location feature of the laptop computer 202 and to resubmit the request. If a mobile device provides a corresponding geographical location, but the corresponding geographical location is not within a specified distance of any specified geographical location, an offline access control key created by the access application 214 disables access, for the mobile device, to the content stored on the mobile device. For example, if the laptop computer 202 is at a hotel, the offline access control key created by the access application 214 does not enable the copy of the design blueprints 212 stored on the laptop computer 202 to be read via the laptop computer 202, and sends a request denied/access disabled message to the laptop computer 202. Furthermore, disabling off-line access to content stored on a mobile device may include deleting the content on the mobile device and/or scrambling the content on the mobile device. For example, if the laptop computer 202 is at a hotel, the offline access control key created by the access application 214 scrambles and then deletes the design blueprints 212 from the laptop computer 202, and sends a request denied/content scrambled and deleted message to the laptop computer 202. The access application 214 provides a new level of security and compliance for the set of content 212 to be accessed only from specified geographical locations.

Figure 3:
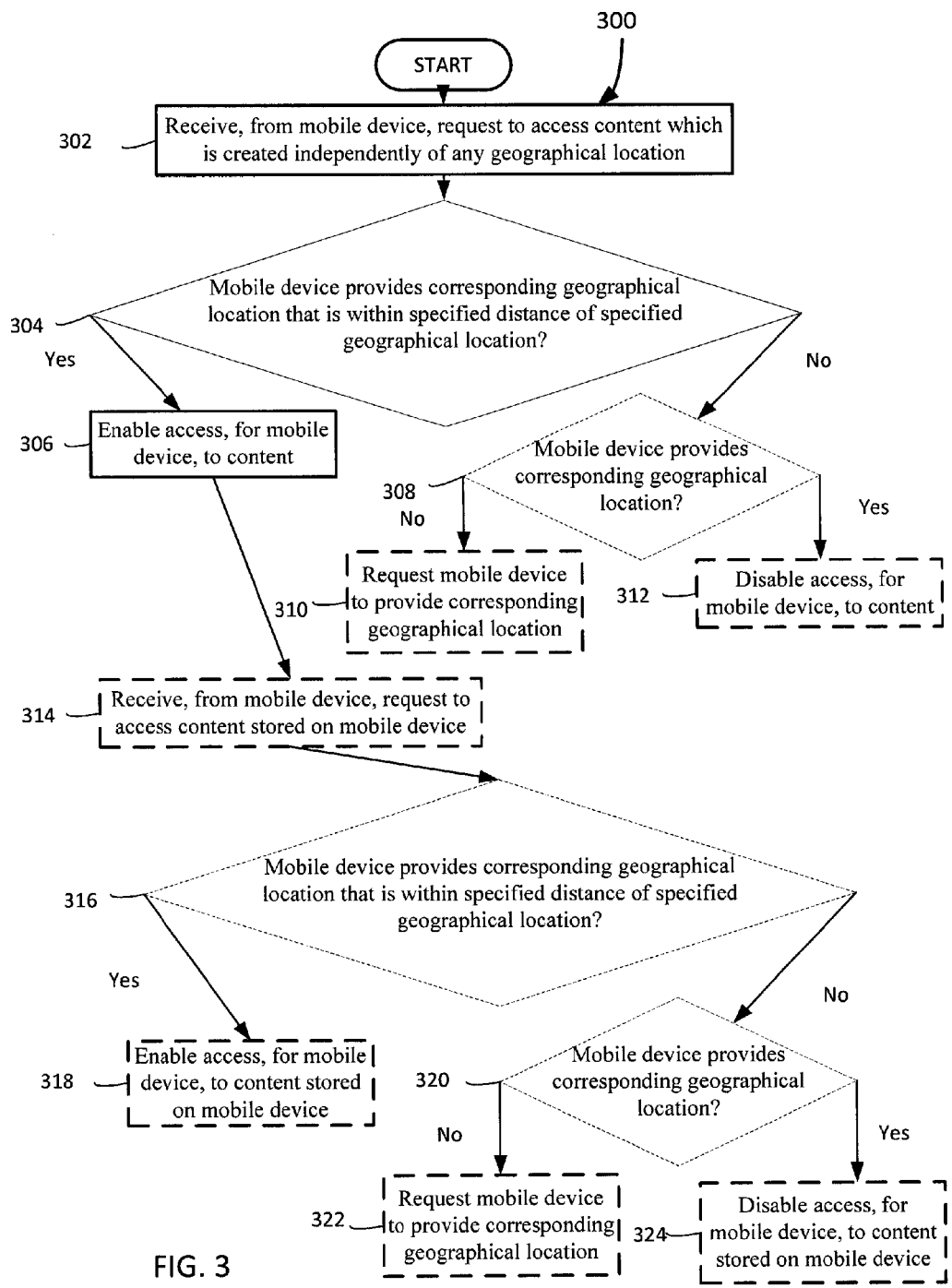
FIG. 3 is a flowchart that illustrates a method of content access based on geographical location, under an embodiment.

FIG. 3 is a flowchart that illustrates a method for content access based on mobile device geographical location, under an embodiment. Flowchart 300 illustrates method acts illustrated as flowchart blocks for certain steps involved in and/or between the clients 202-206 and/or the server 208 of FIG. 2.

A request is received, from a mobile device, to access content which is created independently of any geographical location, block 302. For example, the access application 214 receives a request to download from the set of content 212, which includes the manufacturing company's design blueprints 212, to the laptop computer 202 used by one of the manufacturing company's engineers.

A determination is made whether a mobile device provides a corresponding geographical location that is within a specified distance of a specified geographical location, block 304. For example, the access application 214 determines if the laptop computer 202 identifies its geographical location as within 500 feet of the center of the manufacturing company's headquarters or within 200 feet of the center of the manufacturing company's branch office. If a mobile device provides a corresponding geographical location that is within a specified distance of a specified geographical location, the flowchart 300 continues to block 306. If a mobile device does not provide a corresponding geographical location that is within a specified distance of a specified geographical location, the flowchart 300 proceeds to block 308.

Access is enabled, for a mobile device, to content, block 306. For example, the access application 214 enables the downloading of the requested design blueprints 212 to the laptop computer 202 because the access application 214 has determined that the engineer's laptop computer 202 is within 500 feet of the center of the manufacturing company's headquarters. Then the flowchart 300 continues to block 314.

A determination is optionally made whether a mobile device provides any corresponding geographical location, block 308. For example, the access application 214 determines whether the laptop computer 202 provides any corresponding geographical location. If a mobile device does not provide any corresponding geographical location, the flowchart 300 continues to block 310. If a mobile device provides any corresponding geographical location, the flowchart 300 proceeds to block 312.

A mobile device is optionally requested to provide a corresponding geographical location, block 310. For example, if the engineer has disabled the geo-location feature of the laptop computer 202, the access application 214 responds to the request to download the design blueprints 212 by prompting the engineer to enable the geo-location feature of the laptop computer 202 and to resubmit the request. Then the flowchart 300 restarts at block 302.

Access is optionally disabled, for a mobile device, to content, block 312. For example, if the laptop computer 202 is at a hotel, the access application 214 does not enable the design blueprints 212 to be downloaded to the laptop computer 202, and sends a request denied/access disabled message to the laptop computer 202. Then the flowchart 300 restarts at block 302.

A request is optionally received, from a mobile device, to access content on the mobile device, block 314. For example, an offline access control key created by the access application 214 receives a request to read the copy of the manufacturing company's design blueprints 212 which is stored to the laptop computer 202 used by one of the manufacturing company's engineers.

A determination is optionally made whether a mobile device provides a corresponding geographical location that is within a specified distance of a specified geographical location, block 316. For example, the offline access control key created by the access application 214 determines if the laptop computer 202 identifies its geographical location as within 500 feet of the center of the manufacturing company's headquarters, within 200 feet of the center of the manufacturing company's branch office, or within 100 feet of the center of the engineer's home residence. If a mobile device provides a corresponding geographical location that is within a specified distance of a specified geographical location, the flowchart 300 continues to block 318. If a mobile device does not provide a corresponding geographical location that is within a specified distance of a specified geographical location, the flowchart 300 proceeds to block 320.

Access is optionally enabled, for a mobile device, to content stored on the mobile device, block 318. For example, the offline access control key created by the access application 214 enables the reading of the requested design blueprints 212 via the laptop computer 202 because the offline access control key created by the access application 214 has determined that the engineer's laptop computer 202 is within 100 feet of the center of the engineer's home residence. Then the flowchart 300 restarts at block 302.

A determination is optionally made whether a mobile device provides any corresponding geographical location, block 320. For example, the offline access control key created by the access application 214 determines whether the laptop computer 202 provides any corresponding geographical location. If a mobile device does not provide any corresponding geographical location, the flowchart 300 continues to block 322. If a mobile device provides any corresponding geographical location, the flowchart 300 proceeds to block 324.

A mobile device is optionally requested to provide a corresponding geographical location, block 322. For example, if the engineer has disabled the geo-location feature of the laptop computer 202, the offline access control key created by the access application 214 responds to the request to read the copy of the design blueprints 212 stored on the laptop computer 202 by prompting the engineer to enable the geo-location feature of the laptop computer 202 and to resubmit the request. Then the flowchart 300 restarts at block 302.

Access is optionally disabled, for a mobile device, to content stored on the mobile device, block 324. For example, if the laptop computer 202 is at a hotel, the offline access control key created by the access application 214 does not enable the copy of the design blueprints 212 stored on the laptop computer 202 to be read via the laptop computer 202, and sends a request denied/access disabled message to the laptop computer 202. Then the flowchart 300 restarts at block 302.

Although FIG. 3 depicts the blocks 302-324 occurring in a specific order, the blocks 302-324 may occur in another order. In other implementations, each of the blocks 302-324 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for content access based on mobile device geographical location, the system comprising:
   a processor-based application, which when executed on a computer, will cause the processor to:
   receive, from a mobile device, a request to access a restricted file identified by a user of the mobile device, the restricted file having been created independently of any geographical location and having access restricted to mobile devices that are located within a predetermined distance of a specified geographic location, the request corresponding to the content of the restricted file and not the specific geographic location of the restricted file;
   determine if the mobile device provides a corresponding geographical location that is within the predetermined distance of the specified geographical location;
   determine whether the mobile device has permission to access the restricted file in response to a determination that the mobile device has provided a corresponding geographical location that is within the predetermined distance of the specified geographical location; and
   enable access, for the mobile device, to the restricted file in response to the determination that the mobile device has provided the corresponding geographical location that is within the predetermined distance of the specified geographical location and therefore has permission to access the restricted file.

2. The system of claim 1, wherein determining if the mobile device provides the corresponding geographical location that is within predetermined distance of the specified geographical location comprises determining if the mobile device provides the corresponding geographical location that is within any of a plurality of predetermined distances of a corresponding plurality of specified geographical locations.

3. The system of claim 1, wherein the access to the restricted file is based on a policy that specifies at least one of a number of accesses, a time duration for potential accesses, and a type of access.

4. The system of claim 1, wherein the processor-based application, when executed, will further cause the processor to:
- determine if the mobile device provides the corresponding geographical location in response to a determination that the mobile device does not provide the corresponding geographical location that is within the predetermined distance of the specified geographical location;
- request the mobile device be configured to provide the corresponding geographical location in response to a determination that the mobile device does not provide the corresponding geographical location; and
- disable access, for the mobile device, to the restricted file in response to a determination that the mobile device provides the corresponding geographical location.

5. The system of claim 1, wherein the processor-based application, when executed, will further cause the processor to:
- receive, from the mobile device, a request for access to the restricted file stored on the mobile device;
- determine if the mobile device provides the corresponding geographical location that is within the predetermined distance of the specified geographical location;
- enable access, for the mobile device, to the restricted file stored on the mobile device in response to a determination that the mobile device provides the corresponding geographical location that is within the predetermined distance of the specified geographical location.

6. The system of claim 5, wherein the processor-based application, when executed, will further cause the processor to:
- determine if the mobile device provides the corresponding geographical location in response to a determination that the mobile device does not provide the corresponding geographical location that is within the predetermined distance of the specified geographical location;
- request the mobile device be configured to provide the corresponding geographical location in response to a determination that the mobile device does not provide the corresponding geographical location; and
- disable access, for the mobile device, to the restricted file stored on the mobile device in response to a determination that the mobile device provides the corresponding geographical location.

7. The system of claim 6, wherein disabling off-line access to the restricted file stored on the mobile device comprises at least one of deleting the restricted file on the mobile device and scrambling the restricted file on the mobile device.

8. A computer-implemented method for content access based on mobile device geographical location, the method comprising:
- receiving, from a mobile device, a request to access a restricted file identified by a user, the restricted file having been created independently of any geographical location and having access restricted to mobile devices that are located within a predetermined distance of a specified geographic location, the request corresponding to the content of the restricted file and not the specific geographic location of the restricted file;
- determining if the mobile device provides a corresponding geographical location that is within a predetermined distance of a specified geographical location;
- determining whether the mobile device has permission to access the restricted file in response to a determination that the mobile device has provided a corresponding geographical location that is within the predetermined distance of the specified geographical location; and
- enabling access, for the mobile device, to the restricted file in response to the determination that the mobile device has provided the corresponding geographical location that is within the predetermined distance of the specified geographical location and therefore has permission to access the restricted file.

9. The method of claim 8, wherein determining if the mobile device provides the corresponding geographical location that is within the predetermined distance of the specified geographical location comprises determining if the mobile device provides the corresponding geographical location that is within any of a plurality of predetermined distances of a corresponding plurality of specified geographical locations, and wherein the access to the restricted file is based on a policy that specifies at least one of a number of accesses, a time duration for potential accesses, and a type of access.

10. The method of claim 8, wherein the method further comprises:
- determining if the mobile device provides the corresponding geographical location in response to a determination that the mobile device does not provide the corresponding geographical location that is within the predetermined distance of the specified geographical location;
- requesting the mobile device be configured to provide the corresponding geographical location in response to a determination that the mobile device does not provide the corresponding geographical location; and
- disabling access, for the mobile device, to the restricted file in response to a determination that the mobile device provides the corresponding geographical location.

11. The method of claim 8, wherein the method further comprises:
- receiving, from the mobile device, a request for access to the restricted file stored on the mobile device;
- determining if the mobile device provides the corresponding geographical location that is within the predetermined distance of the specified geographical location;
- enabling access, for the mobile device, to the restricted file stored on the mobile device in response to a determination that the mobile device provides the corresponding geographical location that is within the predetermined distance of the specified geographical location.

12. The method of claim 11, wherein the method further comprises:
- determining if the mobile device provides the corresponding geographical location in response to a determination that the mobile device does not provide the corresponding geographical location that is within the predetermined distance of the specified geographical location;
- requesting the mobile device be configured to provide the corresponding geographical location in response to a determination that the mobile device does not provide the corresponding geographical location; and
- disabling access, for the mobile device, to the restricted file stored on the mobile device in response to a determination that the mobile device provides the corresponding geographical location.

13. The method of claim 12, wherein disabling off-line access to the restricted file stored on the mobile device comprises at least one of deleting the restricted file on the mobile device and scrambling the restricted file on the mobile device.

14. A computer program product, comprising a non-transitory computer-readable medium having a computer-readable program code embodied therein to be executed by one or more processors, the program code including instructions to:
- receive, from a mobile device, a request to access a restricted file identified by a user, the restricted file having been created independently of any geographical location and having access restricted to mobile devices that are located within a predetermined distance of a specified geographic location, the request corresponding to the content of the restricted file and not the specific geographic location of the restricted file;
- determine if the mobile device provides a corresponding geographical location that is within a predetermined distance of a specified geographical location;
- determine whether the mobile device has permission to access the restricted file in response to a determination that the mobile device has provided a corresponding geographical location that is within the predetermined distance of the specified geographical location; and
- enable access, for the mobile device, to the restricted file in response to the determination that the mobile device has provided the corresponding geographical location that is within the predetermined distance of the specified geographical location and therefore has permission to access the restricted file.

15. The computer program product of claim 14, wherein determining if the mobile device provides the corresponding geographical location that is within the predetermined distance of the specified geographical location comprises determining if the mobile device provides the corresponding geographical location that is within any of a plurality of predetermined distances of a corresponding plurality of specified geographical locations.

16. The computer program product of claim 14, wherein the access to the restricted file is based on a policy that specifies at least one of a number of accesses, a time duration for potential accesses, and a type of access.

17. The computer program product of claim 14, wherein the program code further includes instructions to:
- determine if the mobile device provides the corresponding geographical location in response to a determination that the mobile device does not provide the corresponding geographical location that is within the predetermined distance of the specified geographical location;
- request the mobile device be configured to provide the corresponding geographical location in response to a determination that the mobile device does not provide the corresponding geographical location; and
- disable access, for the mobile device, to the restricted file in response to a determination that the mobile device provides the corresponding geographical location.

18. The computer program product of claim 14, wherein the program code further includes instructions to:
- receive, from the mobile device, a request for access to the restricted file stored on the mobile device;
- determine if the mobile device provides the corresponding geographical location that is within the predetermined distance of the specified geographical location;
- enable access, for the mobile device, to the restricted file stored on the mobile device in response to a determination that the mobile device provides the corresponding geographical location that is within the predetermined distance of the specified geographical location.

19. The computer program product of claim 18, wherein the program code further includes instructions to:
- determine if the mobile device provides the corresponding geographical location in response to a determination that the mobile device does not provide the corresponding geographical location that is within the predetermined distance of the specified geographical location;
- request the mobile device be configured to provide the corresponding geographical location in response to a determination that the mobile device does not provide the corresponding geographical location; and
- disable access, for the mobile device, to the restricted file stored on the mobile device in response to a determination that the mobile device provides the corresponding geographical location.

20. The computer program product of claim 19, wherein disabling off-line access to the restricted file stored on the mobile device comprises at least one of deleting the restricted file on the mobile device and scrambling the restricted file on the mobile device.

* * * * *